United States Patent Office 3,097,040
Patented July 9, 1963

3,097,040
PROCESS FOR DYEING NITROGENOUS FIBERS
Richard Casty, Kaiseraugst, Switzerland, assignor to Ciba Company, Inc., Fair Lawn, N.J.
No Drawing. Filed Feb. 1, 1960, Ser. No. 5,634
Claims priority, application Switzerland Feb. 19, 1959
16 Claims. (Cl. 8—54)

It is known that wool can be advantageously dyed with sulfonated copper phthalocyanines in the presence of a polyglycol ether containing a basic nitrogen atom; without this addition the resulting dyeings are as a rule uneven and practically useless. A similar behavior is observed in the case of other dyestuffs containing sulfonic acid groups, for example those which contain at least two sulfonic acid groups and are capable of entering a chemical bond with the fiber, or the 1:2-chromium or 1:2-cobalt complexes of azo dyestuffs which contains sulfonic acid groups. The advantageous effect of the nitrogenous assistants is, however, in general the less pronounced, the lighter the tint. More especially in the case of the so-called pastel tints even in the presence of the afore-mentioned assistants the dyeings obtained are skittery and the textile materials are not dyed right through. Furthermore, it is as a rule necessary to raise the temperature of the dyebath from about 50° C. to the boil slowly and evenly; this is necessary to ensure that the material is dyed evenly and right through, both in the case of light and dark shades.

The present process enables these disadvantages to be overcome substantially or even completely. According to this process nitrogenous fibers are dyed with dyestuffs containing at least 2 groups imparting solubility in water, preferably sulfonic acid groups and in the presence of a compound containing at least one basic nitrogen atom to which is attached at least one radial containing a polyglycol ether chain, and the molecule contains at least three

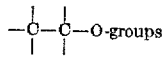-groups as well as at least 4 carbon atoms not forming part of such a group, the dyeing being performed in the presence of an anion-active compound that has no dyestuff character but possesses affinity for the nitrogenous fibers.

The present process is suitable for dyeing nitrogenous fibers that can be dyed with acid dyestuffs by the conventional methods, for example silk, polyamide fibers of ε-caprolactam or of adipic acid and hexamethylenediamine. The process is especially suitable for dyeing wool, or if desired wool blended with other fibers which, if desired, may likewise contain nitrogen.

The present process can be carried out with any dyestuff that contains at least two groups imparting solubility in water, for instance carboxyl groups or preferably sulfonic acid groups and is suitable for dyeing nitrogenous fibers, more especially with dyestuffs that are conventionally used for dyeing wool from an acetic acid bath, including those of the following types:

(A) Dyestuffs that contain sulfonic acid groups and are capable of entering a chemical bond with hydroxylated fibers.
(B) Sulfonated copper phthalocyanines.
(C) Dyestuffs that consist substantially of 1:2-chromium or 1:2-cobalt complexes of azo dyestuffs and contain groups imparting solubility in water.

Quite generally it may be said that the dyestuffs advantageously contain at least two sulfonic acid groups.

The dyestuffs defined under (A) above must contain at least one reactive group or a reactive substituent. In other respects they may belong to a wide variety of classes of dyestuffs, being, for example, stilbene, perinone, peridicarboxylic acid imide, nitro, triphenylmethane, phthalocyanine dyestuffs or, above all acid, anthraquinone or azo dyestuffs including both metal-free and metalliferous and metallizable monoazo and polyazo dyestuffs that contain a grouping or substituent that is capable of reacting with the nitrogenous fibers. In general, particularly good results are obtained with dyestuffs containing two or more sulfonic acid groups.

Among the above reactive groups and substituents there may be mentioned, for example, the ethylene imide group, epoxide groups, the vinyl grouping in a vinylsulfone group or in the acrylic acid radical, and above all, labile substituents that are easy to eliminate with entrainment of the bond electron pair.

As labile substituents capable of elimination with entrainment of the bond electron pair there may be mentioned, for example, aliphatically bound phosphoric or sulfuric acid ester groups, sulfonic acid fluoride groups, aliphatically bound sulfonyloxy groups and above all halogen atoms, more especially a mobile chlorine atom. These labile substituents are advantageously in the γ- or β-position of an aliphatic radical which is bound to the dyestuff molecule directly or through an amino, sulfone or sulfonamide group. Suitable groups are, for example, those of the composition

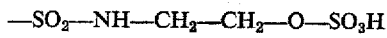

or

these groups may be bifunctional in that, on one hand, they render the dyestuff soluble in water and, on the other, they are capable of reacting with the fibrous material.

In those dyestuffs suitable for the present process which contain as labile substituents halogen atoms, these mobile halogen atoms may also be contained in an aliphatic acyl radical (for example in the β-position of a propionyl radical) or preferably in a heterocyclic system, and in the last-mentioned case there are suitable dyestuffs containing a monohalogenated heterocyclic group, for example a monochlorinated 1:3:5-triazine radical such as the 1:3:5-triazine radical of the formula (1)

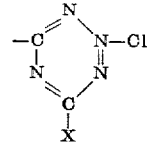

in which X represents an alkyl, aryl, aralkyl, alkylmercapto or arylmercapto group or more especially an unsubstituted or substituted amino group or a, preferably substituted, hydroxyl group—as well as dyestuffs containing a dichlorotriazine group or a trichloropyrimidine or dichloropyrimidine radical.

Numerous dyestuffs of the specified kind are known or can be manufactured by known methods, for example from dyestuff components that as such contain the aforementioned labile substituents, or by incorporating such a labile substituent or a radical containing such a labile substitutent by a known method in the dyestuff molecule of a previously prepared dyestuff. In this manner, by reacting an azo or anthraquinone dyestuff containing a reactive hydroxyl, mercapto or above all amino group, for example with chloracetyl chloride, with β-bromopropionyl chloride or β-chloropropionyl chloride or chloropropionic anhydride, with cyanuric chloride or with a primary condensation product of cyanuric chloride containing two chlorine atoms and, instead of the third chlorine atom of cyanuric chloride, an organic radical, there are obtained valuable condensation products that still contain a mobile chlorine atom and are suitable for dyeing by the present process. Dyestuffs suitable for use in the present process that contain a sulfonylated hydroxyl group can be prepared, for example, by reacting 1 molecular proportion of a dyestuff containing an alkoxy group, for example a sulfonic acid-N-hydroxyalkylamide group, or a β-hydroxyalkylsulfonic acid with at least 1 molecular proportion of an organic sulfonyl halide, for example para-toluenesulfonyl chloride, benzenesulfonyl chloride or ethanesulfonyl chloride, or with concentrated sulfuric acid or with chlorosulfonic acid, in a manner such that the hydroxyl group is acylated.

As dyestuffs of the kind defined above under (B) there are to be used in the present process sulfonated copper phthalocyanines that contain, for example 2, 3 or 4 sulfonic acid groups and, if desired, further substituents such as halogen atoms, more especially chlorine atoms, or sulfonamide groups. There are also suitable dyestuff mixtures, for example sulfonation mixtures the constituents of which differ as to the number of sulfonic acid groups present in them, or mixtures of sulfonated copper phthalocyanines with other dyestuffs suitable for dyeing nitrogenous fibers from an acidic dyebath, among them, above all, those defined under (A) and (C) above.

The dyestuffs defined under (C) are above all 1:2-chromium or cobalt complexes of azo dyestuffs, more especially monoazo dyestuffs, that is to say complexes in which two molecular proportions of an azo dyestuff, or 1 molecular proportion each of two different azo dyestuffs, are bound in complex union to one atom of chromium or cobalt. The complex may, for example, contain one diazo dyestuff and one monoazodyestuff or preferably two identical or different monoazo dyestuff molecules. Suitable solubilizing groups are also in this case free carboxyl groups (—COO-cation) or more especially free sulfonic acid groups (—SO₃-cation); however a carboxyl group participating in the formation of the complex is not considered to be a group imparting solubility in water since, in this kind of bond, it is no longer capable of imparting solubility in water. The groups imparting solubility in water may occupy any desired position in the complex. As a rule, it is of advantage when at least one sulfonic acid group is present. When the complex contains a total of two groups imparting solubility in water, and when the complex-forming metal is represented by Me and the two dyestuffs by $F_1$ and $F_2$ respectively, the following possibilities exist which are shown in the following schematic table:

(c), (d) and (e), the dyestuffs $F_1$ and $F_2$ may in all cases be of identical or different constitution. The groups imparting solubility in water may take up any desired position in the dyestuffs $F_1$ and $F_2$; they may be present in the radical of the diazo component or of the coupling component, and if desired, 2, 3 or 4 such groups may be present in one and the same radical. As a rule, excessive massing of solubilizing groups, more especially sulfonic acid groups—above all in compounds of a relatively low molecular weight—is undesirable because this may reduce the wet fastness of the dyeings. It has been found particularly advantageous when the complex contains, for example, 2 to 4 sulfonic acid groups.

The groups capable of forming metal complexes present in the monoazo dyestuffs are preferably ortho:ortho'-dihydroxyazo groupings or ortho-hydroxy-ortho'-carboxyazo groupings, though also other complex-forming groups are admissible, such as ortho-hydroxy-ortho'-carboxymethoxy or ortho-hydroxy-ortho'-aminoazo groupings.

There are also suitable further dyestuffs containing sulfonic acid groups, not covered by the above definition (A), (B) or (C), preferably azo and anthraquinone dyestuffs of which a large variety has been used for a long time past in the dyeshop.

The afore-mentioned nitrogenous compounds contain at least one basic nitrogen atom to which is attached at least one radical containing a glycol ether chain; this chain consists of at least two members of the formula $$-\underset{|}{\overset{|}{C}}-\underset{|}{\overset{|}{C}}-O-$$

and it can be connected to the nitrogen atom either directly or through a bridge member, for example an alkylene group, such as the radical of the formula $$-CH_2-CH_2-CH_2-$$

The molecule of the nitrogen compound should contain at least three groups of the formula $$-\underset{|}{\overset{|}{C}}-\underset{|}{\overset{|}{C}}-O-$$

or preferably three groups of the formula $$-CH_2-CH_2-O-$$

Furthermore, the nitrogen compound must contain at least 4 carbon atoms not forming part of such a group. Inter alia, it preferably contains also at least one aliphatic or alicyclic radical with at least 8 carbon atoms, prefer-

|  | 2—COOH | 1—COOH+1—SO₃H | 2—SO₃H |
|---|---|---|---|
| 1 dye contains 2 solubilizing groups, 1 dye is free from such groups. | (a) 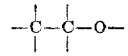 | (c) 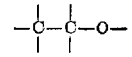 | (e) $Me\begin{smallmatrix}F_1\diagup SO_3H\\ \diagdown\\ F_2\end{smallmatrix}$ |
| Both dyes contain 1 solubilizing group each | (b)  | (d) 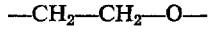 | (f) $Me\begin{smallmatrix}F_1-SO_3H\\ \diagdown\\ F_2-SO_3H\end{smallmatrix}$ |

Especially valuable—inter alia because of their ready accessibility—are the dyestuffs covered by the above Formulae (e) and (f) which contain two sulfonic acid groups in the molecule of the dyestuff complex, or quite generally dyestuffs containing at least two sulfonic acid groups in the molecule of the complex, and among them, above all, dyestuffs in which—as is the case with the complexes (f)—two monoazo dyestuff molecules, each of which contains at least one sulfonic acid group, are bound in complex union to one atom of chromium or cobalt.

Apart from the difference between $F_1$ and $F_2$ which exists as a matter of course between the compounds (a), ably an aliphatic radical with a chain of at least 12 carbon atoms, or an aromatic radical with an aliphatic side chain, which is bound to the basic nitrogen atom through an aryl carbon atom.

From the foregoing it will be realised that the present process can be advantageously performed with the use as nitrogenous compound of the kind referred to above of a reaction product of at least 3 molecular proportions of an α:β-alkylene oxide with 1 molecular proportion of an organic compound containing at least one basic primary or secondary amino group, or one basic tertiary amino group and in addition an alcoholic hydroxyl group, or of a salt thereof or of a quaternary ammonium salt derived therefrom.

Products suitable for use in the present process are those which are accessible by reacting 1 molecular proportion of an amine with at least 3, for example 3 to 20, molecular proportions of an alkylene oxide, for example a product obtained by reacting: 1 mol of dodecylamine with about 6 mols of ethylene oxide, or 1 mol of oleylamine with 6, 8 or 16 mols of ethylene oxide, or 1 mol of stearlyamine with 4, 8 or 16 mols of ethylene oxide, or monoalkyl-propylenediamine, whose alkyl radical corresponds to the radical of the tallow fatty acids, with 8 mols of ethylene oxide, or monoalkyl-propylenediamine, whose alkyl radical is unbranched and contains 16 to 18 carbon atoms, with 6 mols of ethylene oxide.

From the foregoing it will be realized that nitrogen compounds of the formula (2) 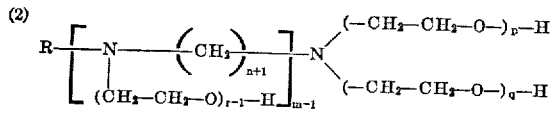

are particularly suitable for use in the present process; in this formula R represents a preferably unbranched aliphatic hydrocarbon radical containing at least 12, and preferably 16 to 22, carbon atoms; $m$ and $n$ each $= 1$ or 2, and $p$, $q$ and $r$ represent whole numbers, the sum $p+q+(m-1)(r-1)$ being at least 3 and at most 20, at least one of the symbols $p$, $q$ or $m-1$ being a number greater than 1.

It will further be realized that nitrogen compounds of the formula (3) 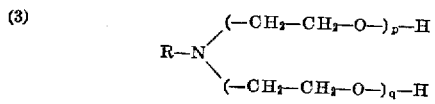

are particularly suitable for performing the present process; in this formula R represents a preferably unbranched aliphatic hydrocarbon radical with at least 12 and preferably 16 to 22 carbon atoms, and $p$ and $q$ represent whole numbers, the sum $p+q$ being at least 3 and preferably from 8 to 16 inclusive.

Instead of a compound containing free alkoxy groups there may be used as assistants in the present process acid esters of polybasic acids, for example those of phosphoric or sulfuric acid derived from said alkoxy compounds, or the water-soluble salts of these esters, for example salts of alkali metals, ammonia or an amine.

The dyeing according to the present process is performed in the presence of an anion-active compound that has no dyestuff character but possesses affinity for the nitrogenous fibers. It is of advantage to use a compound containing sulfonic acid groups in which said groups are advantageously attached to aromatic nuclei, such as benzene nuclei or more especially naphthalene nuclei.

As examples of suitable compounds may be mentioned:

Alkali metal sulfonates of benzene hydrocarbons having a long aliphatic chain,

Alkali metal monosulfates of 2-alkylbenzimidazoles containing a higher alkyl radical, for example the sodium salt of the monosulfonated 2-heptadecyl-N-methyl-benzimidazole, Alkali metal sulfonates of naphthalene substituted by lower alkyl groups, for example sodium diisobutyl-naphthalenesulfonate, Sulfonated condensation products of oxyaryl compounds of the benzene series with formaldehyde, more especially those obtained by condensing an hydroxyaryl compound of the benzene series with formaldehyde, followed by sulfonation and a secondary condensation of the sulfonated product with formaldehyde;

especially good results are obtained with reaction products of naphthalenesulfonic acids with formaldehyde.

Further suitable are products of a different kind, for example fiber-affinic anti-moth preparation containing sulfonic acid groups, or so-called wool resist agents (immunizing agents) of the kind obtained by reacting a phenol or thiophenol with an alkali metal sulfide or sulfite or sulfite-formaldehyde. The amounts of substances to be added to the dyebath used in the present process may vary within relatively wide limits. The amount of dyestuff depends, of course, on the desired tinctorial strength. It is advantageous to adapt the amount of nitrogenous compound to the amount of dyestuff so that they are used at a ratio of about 1:8 to 1:2; it is of advantage to add the nitrogen compound in an amount equal to about ¼ of the amount of dyestuff. At any rate, even when a light shade is aimed at—for which less than 1% of dyestuff is calculated on the weight of the fibers is used—the nitrogen compound should be at least 0.25% of the weight of the fibrous material.

The amount of fiber-affinic anion-active compound is advantageously made the greater, the less dyestuff is used. For very pale shades, for which 0.1% of dyestuff or even less and about 0.5% of the nitrogenous compound is used, it may be advantageous to add about 0.3 to 1% of the anion-active compound.

It is further possible to manufacture a preparation containing the nitrogenous compound and the anion-active substance. Such a stable preparation suitable for performing the present process contains (a) A compound containing at least one basic nitrogen atom to which is attached at least one radical containing a polyglycol ether chain, the molecule containing at least three groups of the formula

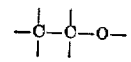

and at least 4 carbon atoms not forming part of such a group, and (b) An anion-active substance that has no dyestuff character but possesses affinity for the nitrogenous fiber. In this case there are used for every part of the nitrogenous compound advantageously 0.2 to 2 parts of the anion-active compound and, if desired, a certain amount of water is added to obtain such a preparation in the form of a mixture or solution.

The amount of such a preparation to be used is such as to ensure the presence of about ½ to 2% of the two assistants (taken as a whole and calculated on the weight of the fibrous material) in the dyebath.

Furthermore, it is found advantageous to dye in a weakly acidic medium so that the pH value of the dyebath is about 3 to 6, preferably 4 to 5. This pH value is advantageously adjusted by adding acetic acid, or if desired, formic or sulfuric acid. It is of further advantage to add sodium sulfate to the dyebath. In some cases it is advantageous to adjust the desired acidity of the dyebath by adding an ammonium salt capable of giving off acid, for example ammonium sulfate, phosphate or acetate.

As is conventional in dyeing nitrogenous fibers, more especially wool, the dyeing is performed at an elevated temperature, advantageously by beginning the actual dyeing operation at about 50 to 80° C., then raising the dyebath to the boil, and continuing and finally terminating the operation at the boil. However, it has been observed that even when dyeing wool by the present process it is not at all necessary to raise the temperature close or exactly to the boiling point of the dyebath; as a rule, practically identical results are obtained by conducting the dyeing operation well below the boiling temperature, for example within a temperature range of 80 to 90° C. Furthermore, it has surprisingly been observed that it is of advantage to pretreat the fibrous material to be dyed, more especially the wool, in a bath containing at first all ingredients except the dyestuff, that is to say the nitrogenous polyglycol compound, the fiber-affinic anion-active substance and acid or an ammonium salt. The textile material is pretreated in this bath at 80 to 100° C. for 15 to 30 minutes. Then—in general without cooling—the dyestuff is added in the form of an aqueous solution, and the material is dyed at 80 to 100° C. until the dyebath is practically exhausted.

By increasing the pH value of the acidic bath after the dyestuff has been absorbed by the material, the wet fastness of the latter to migration of the dyestuff can be improved.

Unless otherwise indicated, parts and percentages in the following examples are by weight.

EXAMPLE 1

100 parts of knitting wool, 3000 parts of water, 10 parts of crystalline sodium sulfate, 6 parts of acetic acid of 40% strength and 0.5 part of the adduct described below of oleylamine and ethylene oxide, 30 parts of crystalline sodium sulfate and 0.6 part of a reaction product of naphthalenesulfonic acid and formaldehyde are heated to 80° C. A solution of 0.1 part of the dyestuff of the formula When the afore-mentioned assistants are omitted, an uneven, practically useless dyeing results.

A level dyeing is likewise obtained by the above process with the only modification that, after addition of the dyestuff solution, the dyebath is raised to 85° C. instead of to the boil, and dyeing is then conducted and completed at about 85° C.

Furthermore, instead of adding to the dyebath successively the ethylene oxide adduct and the reaction product of naphthalenesulfonic acid, there may be added to it 1 part of a preparation obtained by mixing 1 part each of the two afore-mentioned assistants with 1 part of water.

The ethylene oxide adduct is prepared in the following manner:

100 parts of commercial oleylamine are mixed with 1 part of finely distributed sodium and heated to 140° C., whereupon ethylene oxide is introduced at 135–140° C. When the ethylene oxide is being absorbed rapidly, the reaction temperature is lowered to 120–125° C., and the introduction of ethylene oxide is continued until 113 parts thereof have been absorbed. The resulting reaction product gives a practically clear solution in water.

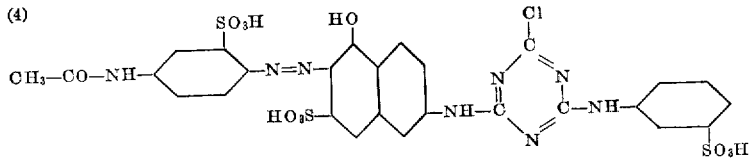

in a little water is added to the dyebath prepared in this manner. In the course of ½ hour the bath is raised to the boil and the wool is dyed for 1 hour at the boil, then rinsed and dried. A light-red, very pure tint is obtained.

Instead of with the dyestuff of the Formula 4 wool can be dyed in the manner described above with each of the following dyestuffs, whereby level dyeings are likewise obtained:

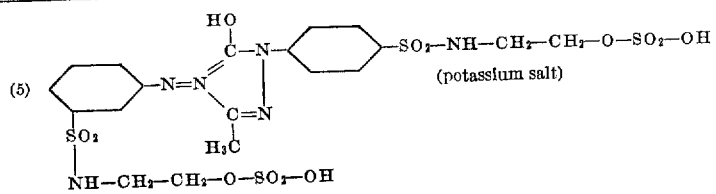

Yellow.

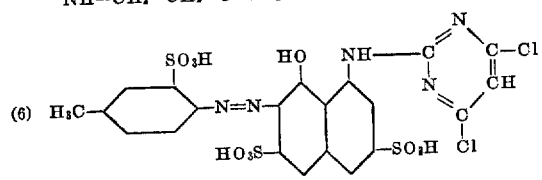

Red.

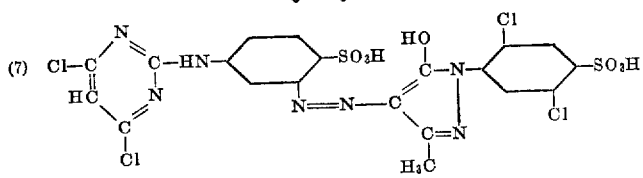

Yellow.

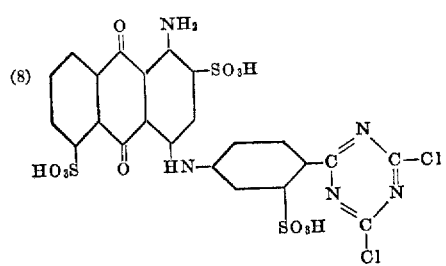

Blue.

(9) 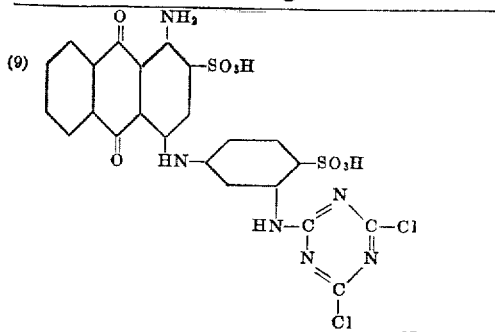 Blue.
(10) 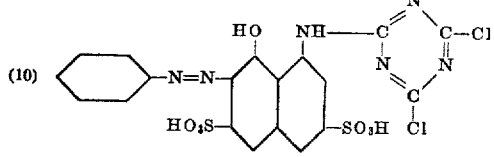 Red.
(11) 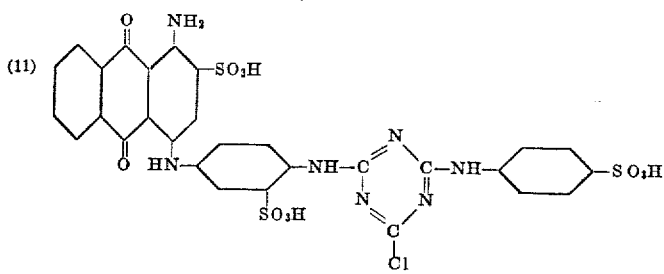 Blue.
(12) 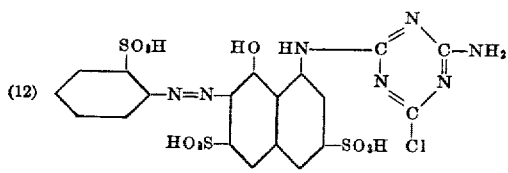 Red.
(13) 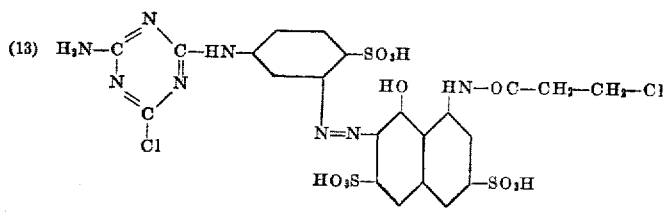 Red.
(14) 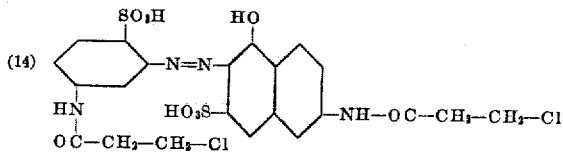 Orange.
(15) 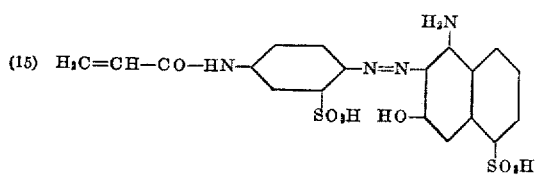 Red.
(16) Violet.
(17) Greenish blue.
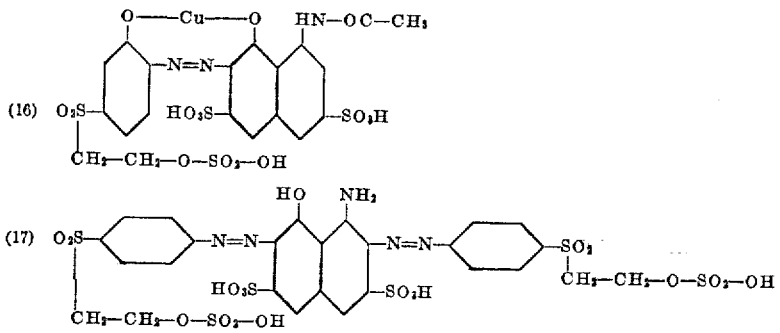

| | |
|---|---|
| Copper phthalocyanine-disulfonic acid containing 1 to 2 —SO₂—NH—CH₂—CH₂Cl groups | Blue. |
| Copper phthalocyanine further substituted by two sulfonic acid groups and 2 groups of the formula —SO₂—NH—CH₂—O—SO₂—OH; these substituents are in positions 3, 4', 4'', and 4'''. | Turquoise. |
| Copper phthalocyanine-disulfonic acid containing 2-3 groups of the formula 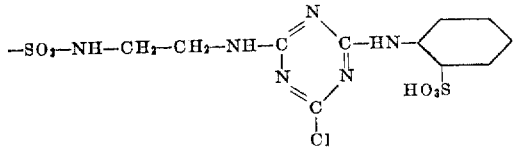 | Do. |

EXAMPLE 2

100 parts of hard-twisted woolen yarn are dyed in a dyebath containing: 3000 parts of water, 30 parts of crystalline sodium sulfate, 4 parts of acetic acid of 40% strength, 0.5 part of the ethylene oxide adduct described in Example 1, 0.5 part of a condensation product of naphthalene-sulfonic acid and formaldehyde, and 0.2 part of copper phthalocyanine-trisulfonic acid.

The yarn is immersed in the dyebath at about 50° C. which is then raised to and maintained at 85° C. for 30 minutes, then further raised to the boil, and dyeing at the boil is performed for 30 minutes.

A pale, greenish blue, level dyeing is obtained.

EXAMPLE 3

The method described in Example 2 is used with the following modification:

The sodium sulfate is omitted, and there are used 0.5 part of the ethylene oxide adduct, 0.2 part of the reaction product of naphthalenesulfonic acid and formaldehyde, and 0.75 part of the afore-mentioned dyestuff.

A very level turquoise dyeing is obtained. The hard-twisted yarn is dyed right through.

EXAMPLE 4

A dyebath is prepared from 3000 parts of water, 10 parts of crystalline sodium sulfate, 6 parts of acetic acid of 40% strength, 0.5 part of the adduct described in Example 1 of oleylamine and ethylene oxide, 0.4 part of a condensation product of naphthalenesulfonic acid and formaldehyde, and 0.2 part of the dyestuff described below. At 50 to 80° C. 100 parts of knitting wool are immersed in this dyebath, which is then raised to the boil within ½ hour, and dyeing is performed for 1 hour at the boil. The dyed wool is rinsed and dried. A level, pale, bluish grey dyeing results.

Manufacture of the Dyestuff 41.6 parts of the monoazo dyestuff obtained by coupling diazotised 1-amino-2-hydroxynaphthalene-4-sulfonic acid with 1-hydroxynaphthalene are dissolved in 1000 parts of water and treated with 100 parts by volume of a sodium chromesalicylate solution containing 2.85% of chromium. The whole is refluxed for several hours, whereupon the metallization is complete. The chromium complex is salted out with sodium chloride, filtered off and dried.

EXAMPLE 5

The procedure used is the same as that described in Example 4, except that the chromiferous dyestuff used in that example is replaced by one of the undermentioned 1:2-metal complexes which are accessible by the usual methods, and level dyeings are likewise obtained.

In the Table A are shown 1:2-complexes in which two molecular proportions of a dyestuff are bound in complex union to one atomic proportion of metal.

TABLE A

| Metal | Dyestuff | Tint |
|---|---|---|
| Co | (18) [structure] | Brown. |
| Co | (19) [structure] | Violettish brown. |
| Cr | (20) [structure] | Red. |
| Cr | (21) [structure] | Reddish blue. |

TABLE A—Continued.

| Metal | Dyestuff | Tint |
|---|---|---|
| Cr | (22) [structure: 4-chloro-2-hydroxy-6-nitrophenyl–N=N–1-hydroxynaphthalene-4-sulfonic acid] | Reddish blue. |
| Co | (23) [structure: 2-hydroxy-3,5-dinitrophenyl–N=N–1-amino-2-naphthol-sulfonic acid] | Green. |
| Co | (24) [structure: 4-chloro-2-hydroxy-6-sulfophenyl–N=N–1-hydroxynaphthalene-sulfonic acid] | Violet. |
| Co | (25) [structure: 4-chloro-2-hydroxy-6-sulfophenyl–N=N–C(OH)=C(C-NH)-C(COOH)=N pyrazole] | Reddish brown. |

In the following Table B are listed 1:2-complexes in which 1 molecule each of two different dyestuffs are bound to one atomic proportion of metal in complex union:

TABLE B

| Metal | 1st dyestuff | 2nd dyestuff | Tint |
|---|---|---|---|
| Cr | (26) [HO$_3$S–naphthyl(OH)–N=N–naphthyl(HO)(SO$_3$H)] | (27) [HO$_3$S,Cl-phenyl(OH)–N=N–naphthyl(HO)(Cl,Cl)] | Blue. |
| Cr | (21) [HO$_3$S–naphthyl(OH)–N=N–naphthyl(HO)] | (28) [HO$_3$S–phenyl(OH)–N=N–naphthyl(HO)(Cl,Cl)] | Grey-blue. |
| Cr | (29) [O$_2$N–phenyl(OH)–N=N–naphthyl(H$_2$N)(SO$_3$H)] | (27) [HO$_3$S,Cl-phenyl(OH)–N=N–naphthyl(HO)(Cl,Cl)] | Bluish grey. |
| Cr | (30) [HO$_3$S–phenyl(OH)(O$_2$N)–N=N–naphthyl(HO)] | (27) [HO$_3$S,Cl-phenyl(OH)–N=N–naphthyl(HO)(Cl,Cl)] | Do. |

| Metal | 1st dyestuff | 2nd dyestuff | Tint |
|---|---|---|---|
| Cr | (30) | (31) | Brown. |
| Cr | (34) | (35) | Brown violet. |
| Cr | (36) | (37) | Grey blue. |

EXAMPLE 6

A dyebath is prepared from 3000 parts of water, 5 parts of ammonium phosphate, 0.6 part of the adduct described in Example 1 of oleylamine and ethylene oxide, as well as 0.4 part of a condensation product of naphthalene-sulfonic acid and formaldehyde, and 100 parts of a woollen fabric are immersed in it. The whole is raised to the boil within a short time and maintained at the boil for 15 to 20 minutes. An aqueous solution of 2 parts of one of the dyestuffs described in Examples 4 and 5 is then added to the boiling dyebath, and dyeing is performed for 1 hour at the boil.

Fast, level dyeings result of a darker tint than those produced as described in Examples 4 and 5.

EXAMPLE 7

Dyeing is performed as described in Example 4 or 5, except that the dyebath is raised to 85° C. instead of to the boil. Level dyeings are likewise obtained.

EXAMPLE 8

A dyebath is prepared from 3000 parts of water, 5 parts of acetic acid of 40% strength, 0.5 part of the ethylene oxide adduct described in Example 1, 0.6 part of a condensation product of naphthalenesulfonic acid and formaldehyde, and 0.1 part of one of the following dystuffs. At 50° C. 100 parts of wool gabardine are immersed in the dyebath, the temperature is raised within ½ hour to the boil, and dyeing is performed for 1 hour at the boil. The fabric is dyed a level tint right through.

| | Tint |
|---|---|
| (39) | Ruby red. |
| (40) | Red. |
| (41) | Scarlet. |
| (42) | Blue. |

EXAMPLE 9

A dyebath is prepared from 3000 parts of water, 10 parts of crystalline sodium sulfate, 6 parts of acetic acid of 40% strength, 0.5 part of one of the undermentioned ethylene oxide adducts (a) to (g), 0.4 part of a condensation product of naphthalenesulfonic acid and formaldehyde, and 0.2 part of one of the dyestuffs of the Formulae 4, 21 or 30. At 50° C. 100 parts of knitting wool are immersed in the dyebath, which is then raised within ½ hour to the boil, and the wool is dyed for 1 hour at the boil, then rinsed and dried. Level dyeings result in all cases.

(a) Adduct of 8 molecular proportions of ethylene oxide and a mixture of arachidylamine and behenylamine.
(b) Adduct of 12 molecular proportions of ethylene oxide and a mixture of arachidylamine and behenylamine.
(c) Adduct of 4 molecular proportions of ethylene oxide and stearylamine.
(d) Adduct of 20 molecular portions of ethylene oxide and a mixture of arachidylamine and behenylamine.
(e) Adduct of 8 molecular proportions of ethylene oxide and a mixture containing 30% of palmitylamine, 45% of octadecenylamine and 25% of stearylamine.
(f) Adduct of 6 molecular proportions of ethylene oxide and a mixture of N-alkyl-propylenediamines of which the alkyl residues contain 16 to 18 carbon atoms.
(g) Adduct of 8 molecular proportions of ethylene oxide and a mixture of N-alkyl-propylenediamines of which the alkyl residues contain 16 to 18 carbon atoms.

EXAMPLE 10

The method described in Example 4 is used, except that the condensation product of naphthalenesulfonic acid and formaldehyde is replaced by the product that is obtained when a mixture of 2 molecular proportions of phenol and 1 molecular proportion of para-dodecylphenol is condensed with 1.75 molecular proportions of formaldehyde, the reaction product is sulfonated, the sulfonic acid thus obtained is further condensed with formaldehyde, and the product is neutralised with ammonia. A level dyeing is obtained.

Instead of the assistant prepared from phenol and paradodecylphenol there may be used a product obtained from 2 molecular porportions of phenol and 1 molecular proportion of paracresol or para-octylphenol.

What is claimed is:

1. A process which comprises dyeing wool with dyestuffs containing at least 2 HO$_3$S-groups in the presence of a compound of the formula

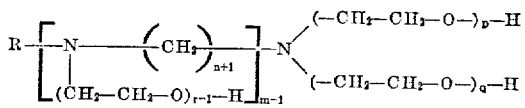

in which R represents an aliphatic hydrocarbon radical containing at least 12 and at most 22 carbon atoms, $m$ and $n$ each represent a whole number of at the most 2, and $p$, $q$ and $r$ represent whole numbers, the sum $p+q+(m-1)(r-1)$ being at least 3, at least one of the symbols $p$, $q$ and $(r-1)$ being greater than 1, and in the presence of an anion-active substance that has no dyestuff character but possesses affinity for the wool.

2. A process which comprises dyeing wool with dyestuffs containing at least 2 groups imparting solubility in water in the presence of a compound of the formula

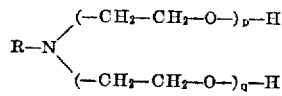

in which R represents an aliphatic hydrocarbon radical containing 16 to 22 carbon atoms and $p$ and $q$ represent whole numbers, the sum $p+q$ being at least 3 and at most 20, and in the presence of an anion-active substance that has no dyestuff character but possesses affinity for the wool.

3. A process which comprises dyeing wool with dyestuffs containing at least 2 HO$_3$S-groups in the presence of a compound of the formula

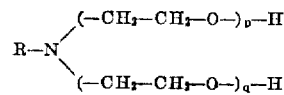

in which R represents an aliphatic hydrocarbon radical containing 16 to 22 carbon atoms and $p$ and $q$ represent whole numbers, the sum $p+q$ being at least 3 and at most 20, and in the presence of an anion-active substance that has no dyestuff character but possesses affinity for the wool.

4. A process which comprises dyeing wool with dyestuffs containing at least 2 HO$_3$S-groups in the presence of a compound of the formula

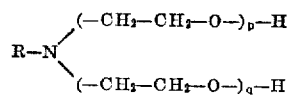

in which R represents an aliphatic hydrocarbon radical containing 16 to 22 carbon atoms and $p$ and $q$ represent whole numbers, the sum $p+q$ being at least 3 and at most 20, and in the presence of a sulfonated condensation product of a hydroxybenzene and formaldehyde.

5. A process which comprises dyeing wool with dyestuffs containing at least 2 HO$_3$-groups in the presence of a compound of the formula

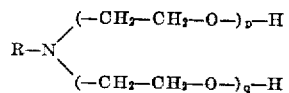

in which R represents an aliphatic hydrocarbon radical containing 16 to 22 carbon atoms and $p$ and $q$ represent whole numbers, the sum $p+q$ being at least 3 and at most 20, and in the presence of a condensation product of naphthalene sulfonic acid and formaldehyde.

6. A process which comprises dyeing wool with dyestuffs containing at least two sulfonic acid groups and which are capable of entering a chemical bond with hydroxylated fibers in the presence of a compound of the formula

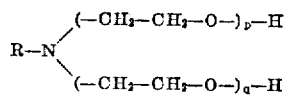

in which R represents an aliphatic hydrocarbon radical containing 16 to 22 carbon atoms and $p$ and $q$ represent whole numbers, the sum $p+q$ being at least 3 and at most 20, and in the presence of a condensation product of naphthalene sulfonic acid and formaldehyde.

7. A process which comprises dyeing wool with dyestuffs containing at least two sulfonic acid groups and at least one chlorotriazine radical in the presence of a compound of the formula

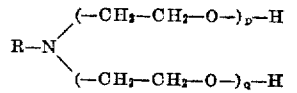

in which R represents an aliphatic hydrocarbon radical containing 16 to 22 carbon atoms and $p$ and $q$ represent whole numbers, the sum $p+q$ being at least 3 and at most 20, and in the presence of a condensation product of naphthalene sulfonic acid and formaldehyde.

8. A process which comprises dyeing wool with copper-phthalocyanines containing at least 2 sulfonic acid groups in the presence of a compound of the formula

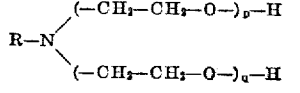

in which R represents an aliphatic hydrocarbon radical containing 16 to 22 carbon atoms and $p$ and $q$ represent whole numbers, the sum $p+q$ being at least 3 and at most 20, and in the presence of a condensation product of naphthalene sulfonic acid and formaldehyde.

9. A process which comprises dyeing wool with 1:2-chromium complexes of azo dyestuffs, the molecule of the chromium complex containing at least two sulfonic acid groups in the presence of a compound of the formula

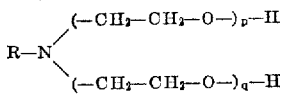

in which R represents an aliphatic hydrocarbon radical containing 16 to 22 carbon atoms and $p$ and $q$ represent whole numbers, the sum $p+q$ being at least 3 and at most 20, and in the presence of a condensation product of naphthalene sulfonic acid and formaldehyde.

10. A process which comprises dyeing wool with 1:2-cobalt complexes of azo dyestuffs, the molecule of the cobalt complex containing at least two sulfonic acid groups in the presence of a compound of the formula

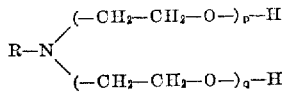

in which R represents an aliphatic hydrocarbon radical containing 16 to 22 carbon atoms and $p$ and $q$ represent whole numbers, the sum $p+q$ being at least 3 and at most 20, and in the presence of a condensation product of naphthalene sulfonic acid and formaldehyde.

11. A stable preparation containing
(a) a compound of the formula

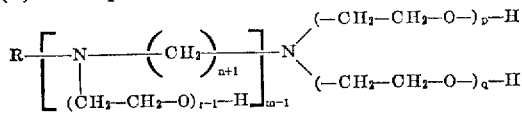

in which R represents an aliphatic hydrocarbon radical containing at least 12 and at most 22 carbon atoms, $m$ and $n$ each represent a whole number of at the most 2, and $p$, $q$ and $r$ represent whole numbers, the sum $p+q+(m-1)(r-1)$ being at least 3, at least one of the symbols $p$, $q$ and $(r-1)$ being greater than 1, and (b) an anion active substance that has no dyestuff character but, possesses affinity for nitrogenous fibers.

12. A process which comprises dyeing wool with metal-free azo dyestuff containing in its molecular structure at least 2 $HO_3S$-groups in the presence of (a) a compound of the formula

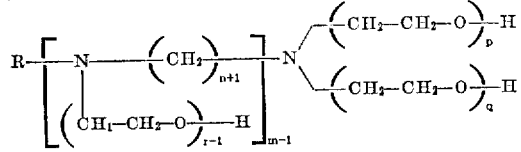

in which R represents an aliphatic hydrocarbon radical containing at least 12 and at most 22 carbon atoms; each of $m$ and $n$ represents a whole number of at most 2; and each of $p$, $q$ and $r$ represents a whole number, the sum $p+q+(m-1)(r-1)$ being at least 3, at least one of the symbols $p$, $q$ and $(r-1)$ being greater than 1; and (b) an anion-active substance that has no dyestuff character but possesses affinity for wool.

13. A process which comprises dyeing wool with phthalocyanine dyestuff containing in its molecular structure at least 2 $HO_3S$-groups in the presence of (a) a compound of the formula

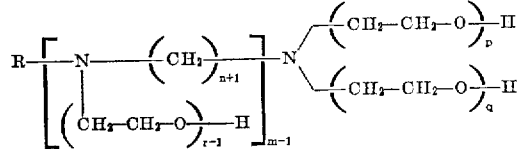

in which R represents an aliphatic hydrocarbon radical containing at least 12 and at most 22 carbon atoms; each of $m$ and $n$ represents a whole number, the sum $p+q+(m-1)(r-1)$ being at least 3, at least one of the symbols $p$, $q$ and $(r-1)$ being greater than 1; and (b) an anion-active substance that has no dyestuff character but possesses affinity for wool.

14. A process which comprises dyeing wool with 1:2-metal complex dyestuff containing in its molecular structure at least 2 $HO_3S$-groups in the presence of (a) a compound of the formula

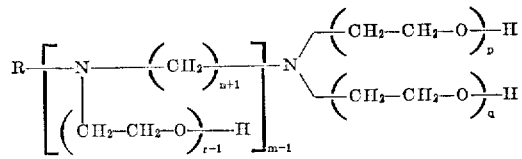

in which R represents an aliphatic hydrocarbon radical containing at least 12 and at most 22 carbon atoms; each of $m$ and $n$ represents a whole number of at most 2; and each of $p$, $q$ and $r$ represents a whole number, the sum $p+q+(m-1)(r-1)$ being at least 3, at least one of the symbols $p$, $q$ and $(r-1)$ being greater than 1; and (b) an anion-active substance that has no dyestuff character but possesses affinity for wool.

15. A process which comprises dyeing wool with anthraquinone dyestuff containing in its molecular structure at least 2 $HO_3S$-groups in the presence of (a) a compound of the formula

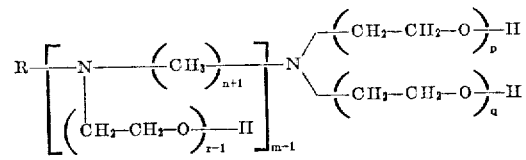

in which R represents an aliphatic hydrocarbon radical containing at least 12 and at most 22 carbon atoms; each of $m$ and $n$ represents a whole number of at most 2; and each of $p$, $q$ and $r$ represents a whole number, the sum $p+q+(m-1)(r-1)$ being at least 3, at least one of the symbols $p$, $q$ and $(r-1)$ being greater than 1; and (b) an anion-active substance that has no dyestuff character but possesses affinity for wool.

16. A process which comprises dyeing wool with fiber-reactive anthraquinone dyestuff containing in its molecular structure more than 2 $HO_3S$-groups in the presence of (a) a compound of the formula

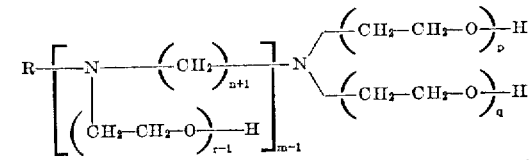

in which R represents an aliphatic hydrocarbon radical containing at least 12 and at most 22 carbon atoms; each of $m$ and $n$ represents a whole number of at most 2; and each of $p$, $q$ and $r$ represents a whole number, the sum $p+q+(m-1)(r-1)$ being at last 3, at least one of the symbols $p$, $q$ and $(r-1)$ being greater than 1; and (b) an anion-active substance that has no dyestuff character but possesses affinity for wool.

References Cited in the file of this patent
UNITED STATES PATENTS

| Number | Name | Date |
|---|---|---|
| 1,926,556 | Nuesslein | Sept. 12, 1933 |
| 1,970,578 | Schoeller et al. | Aug. 21, 1934 |
| 2,179,371 | Dyer | Nov. 7, 1939 |
| 2,214,067 | Petersen | Sept. 10, 1940 |
| 2,228,369 | Schoeller | Jan. 14, 1941 |
| 2,310,074 | Gotte | Feb. 2, 1943 |
| 2,773,871 | Brassell et al. | Dec. 11, 1956 |
| 2,852,331 | Youse | Sept. 16, 1958 |
| 2,940,812 | Denyer et al. | June 14, 1960 |
| 2,997,362 | Baumann | Aug. 22, 1961 |

UNITED STATES PATENT OFFICE
CERTIFICATE OF CORRECTION

Patent No. 3,097,040  
July 9, 1963

Richard Casty

It is hereby certified that error appears in the above numbered patent requiring correction and that the said Letters Patent should read as corrected below.

Column 12, TABLE A, the right-hand portion of the third formula should appear as shown below instead of as in the patent:

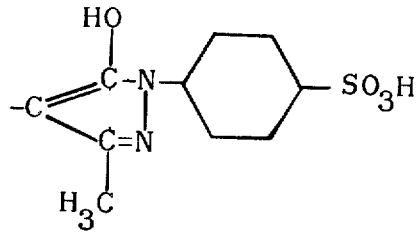

column 16, line 39, for "dystuffs" read -- dyestuffs --; column 18, line 27, for "$HO_3$-groups" read -- $HO_3S$-groups --.

Signed and sealed this 12th day of May 1964.

(SEAL)  
Attest:

ERNEST W. SWIDER  
Attesting Officer

EDWARD J. BRENNER  
Commissioner of Patents